(12) United States Patent
Diedrich et al.

(10) Patent No.: US 6,342,905 B1
(45) Date of Patent: Jan. 29, 2002

(54) OBJECT ORIENTED APPARATUS AND METHOD FOR PROVIDING A GRAPHICAL USER INTERFACE FOR HOST-BASED SOFTWARE APPLICATIONS

(75) Inventors: Richard Alan Diedrich; Mark Matthew Even; Randy William Ruhlow, all of Rochester; Bruce Joseph Ryba, Fountain, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/484,106

(22) Filed: Jan. 14, 2000

Related U.S. Application Data (62) Division of application No. 08/974,121, filed on Nov. 19, 1997, now Pat. No. 6,064,382.

(51) Int. Cl.[7] .............................. G06F 3/00; G06F 3/14
(52) U.S. Cl. ................... 345/746; 345/764; 345/733; 345/744; 709/201; 709/203; 709/219; 709/328; 703/24
(58) Field of Search ............................... 345/335, 333, 345/334, 339, 329, 744, 762, 763, 764, 733; 395/682, 680, 500; 709/203, 219

(56) References Cited

U.S. PATENT DOCUMENTS

| | | | | |
|---|---|---|---|---|
| 5,179,700 A | * | 1/1993 | Aihara et al. | 345/326 |
| 5,327,529 A | * | 7/1994 | Fults et al. | 345/335 |
| 5,461,716 A | * | 10/1995 | Eagen et al. | 345/340 |
| 5,673,403 A | * | 9/1997 | Brown et al. | 345/335 |
| 5,754,173 A | * | 5/1998 | Hiura et al. | 345/333 |
| 5,768,510 A | * | 6/1998 | Gish | 395/200.33 |
| 5,774,720 A | * | 6/1998 | Borgendale et al. | 395/682 |
| 5,802,530 A | * | 9/1998 | Van Hoff | 707/503 |
| 5,990,852 A | * | 11/1999 | Szamre | 345/2 |
| 6,166,728 A | * | 12/2000 | Haman et al. | 345/327 |

* cited by examiner

*Primary Examiner*—Raymond J. Bayerl
*Assistant Examiner*—Cuong T. Thai
(74) *Attorney, Agent, or Firm*—Martin & Associates, LLC; Derek P. Martin (57) ABSTRACT

An object oriented computer apparatus and method provides a graphical user interface (GUI) for existing host-based (i.e., green screen) applications by defining some object oriented classes that reside on the client workstation, and by substituting function calls for display data in the green screen application with function calls that interface with the object oriented GUI defined by the classes. In this manner the present invention takes advantage of the processing power of client workstations in a network computing environment by having the client run the GUI. The underlying green screen application is modified to replace all display function calls with new function calls to the GUI, but this change is relatively minor and does not affect the underlying core logic of the application. In addition, the new function calls access the GUI screens directly without having to determine which screen is being displayed.

8 Claims, 11 Drawing Sheets

OBJECT ORIENTED APPARATUS AND METHOD FOR PROVIDING A GRAPHICAL USER INTERFACE FOR HOST-BASED SOFTWARE APPLICATIONS

RELATED APPLICATION

This patent application is a divisional of Ser. No. 08/974,121, U.S. Pat. No. 6,064,382, "Object Oriented Apparatus And Method For Providing a Graphical User Interface For Host-based Software Applications", filed on Nov. 19, 1997, which is incorporated herein by reference.

BACKGROUND OF THE INVENTION

1. Technical Field

This invention generally relates to computer systems, and more specifically relates to data processing in computer systems using a graphical user interface (GUI).

2. Background Art

The development of the EDVAC computer system of 1948 is often cited as the beginning of the computer era. Since that time, computer systems have evolved into extremely sophisticated devices, and computer systems may be found in many different settings. In the early days of computers, one or more relatively powerful and expensive computers could be shared by many users. A network of computer terminals were typically connected to a single computer known as a "host." These computer terminals are commonly known as non-programmable workstations (i.e., "dumb terminals") because they simply display information transmitted to it by the host, and lack any processing power to perform local tasks. One example of a very well-known computer terminal is the IBM 5250, which displays alpha-numeric text in row and column format. In a computing environment with a host and one or more terminals, software applications run on the host, and display information is transmitted by the host to the terminals, which displays an appropriate screen to the user. The user may then enter data in response to the displayed screen, if required. Software applications that ran on these types of systems are known as "host-based" software applications. These are commonly referred to in the computer industry as "green screen" applications, taking their name from the green color of many of the dumb terminals used to interact with these applications.

Green screen applications typically display information in a text-only format of rows and columns on a terminal or computer screen. More modern advances in user interfaces have resulted in a variety of Graphical User Interfaces (GUIs) that allow a user to interact with the computer using a pointing device such as a mouse. A GUI is typically much easier for a user to use compared to a green screen interface. A GUI may provide windows, drop-down lists, context-sensitive help, etc., all at the click of a button. An example of a GUI is the OS/2 operating system developed and sold by IBM. As users become more familiar with GUI concepts, entering data into an "old fashioned" green screen application becomes more tedious and frustrating. However, converting all green screen applications to include a GUI would be a formidable and expensive undertaking.

Many green screen applications have been developed for a variety of different industries and companies at great expense. To completely re-write a green screen application to provide a GUI would take considerable time and resources. Not only would it be time-consuming and expensive to re-write a green screen application, but it also would essentially throw away much of the benefit of having stable, solid code that has been debugged and operating correctly for some period of time. A re-write would undoubtedly produce a host of new bugs that would have to be corrected. Thus, what is needed is a way to provide a GUI front-end on a green screen application to avoid re-writing the underlying logic that is tried and true.

One known solution that provides a GUI for green screen applications is known as "screen scraping." With a screen scraping approach, the underlying code of the green screen application is not affected. It still puts and gets data in data streams just as it always did. Screen scraping provides software that takes the screen information and compares the screen information against a table or other database of possible screens for the particular application. Once the screen information is correlated to a known screen, the screen scraping software knows what information needs to be displayed, and can map that information to a GUI.

While screen scraping provides a GUI for a green screen application, it does so at considerable performance cost. Essentially, one or more processes must continually run to provide the translation between green screen format and GUI format. As explained above, this translation typically requires detecting the screen to be displayed and then displaying the corresponding GUI screen. Unfortunately, the time and effort to detect the screen and provide an appropriate GUI often results in severe performance penalties. Thus the user is faced with a dilemma of whether to use the native green screen interface to achieve expected performance, or to use a new GUI screen scraping interface that significantly impacts the performance.

With the introduction of the personal computer (PC), networks for personal computers were developed that allow computers to intercommunicate. Thus, instead of providing a host-based system of the past, the personal computer made it possible to have a network of powerful workstations rather than dumb terminals. The processing power of a workstation makes it possible to share processing between computers on a network, rather than having all the processing performed by a host computer. Thus emerged a new paradigm known as client/server computing, or network computing, which allows computer workstations known as clients to interact with one or more server computers.

Migrating green screen applications that were developed for a host-based system into the client/server environment is relatively straightforward. The easiest way is for the computer workstations to emulate a dumb terminal. While this approach does not take advantage of the processing power of the client workstations, it does allow green screen applications to be implemented in a network computing environment with a minimum of effort. However, as described above, users in a network computing environment are becoming more accustomed to GUIs for their applications, and would prefer to interact with green screen applications using a GUI.

Thus, at present, the computer industry is faced with the untenable decision of whether 1) to continue to provide a green screen interface to existing applications, to the chagrin of users, 2) to provide a GUI for a green screen application using screen scraping at the cost of significant system performance, or 3) to re-write the green screen application to provide a GUI front-end. For the various reasons described above, these solutions all suffer from drawbacks, and a more cost-effective and performance-sensitive solution to providing a GUI for a green screen application is needed.

DISCLOSURE OF INVENTION

According to the present invention, an object oriented computer apparatus and method provides a graphical user interface (GUI) for existing host-based (i.e., green screen) applications by defining some object oriented classes that reside on the client workstation, and by substituting function calls for display data in the green screen application with function calls that interface with the object oriented GUI defined by the classes. In this manner the present invention takes advantage of the processing power of client workstations in a network computing environment by having the client run the GUI. The underlying green screen application is modified to replace all display function calls with new function calls to the GUI, but this change is relatively minor and does not affect the underlying core logic of the application. In addition, the new function calls access the GUI screens directly without having to determine which screen is being displayed.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention is accomplished through the use of object oriented programming concepts, and the best mode of the present invention is implemented using the JAVA object oriented programming language. For those who are not familiar with object oriented programming concepts or JAVA, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

The goal of using object oriented programming is to create small, reusable sections of program code known as objects that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object as it is created. This feature of object oriented programming promotes the reusability of existing object definitions and promotes more efficient use of program code.

There are many computer languages that presently support object oriented programming techniques. For example, Smalltalk, Object Pascal, C++ and JAVA are all examples of programming languages that support object oriented programming to one degree or another.

JAVA Programming Language

JAVA is a modem object oriented programming language designed by Sun Microsystems that has grown in popularity in recent years. JAVA offers many features and advantages that makes it a desirable programming language to use. First, JAVA is specifically designed to create small application programs, commonly called "applets," that can reside on the network in centralized servers, and which are delivered to the client machine only when needed. Second, JAVA is completely platform independent. A JAVA program can be written once and can then run on any type of platform that contains a JAVA Virtual Machine (JVM). The JVM model is supported by most computer vendors, thereby allowing a software vendor to have access to hardware and software systems produced by many different companies. Finally, JAVA is an object oriented language, meaning that software written in JAVA can take advantage of the benefits of object oriented programming techniques.

As in other object oriented systems, operations in JAVA are performed by one object calling a method on another object. These objects can reside locally on the same machine or on separate JVM's physically located on separate computers or systems.

Host-Based (Green Screen) Applications

Figure 2:
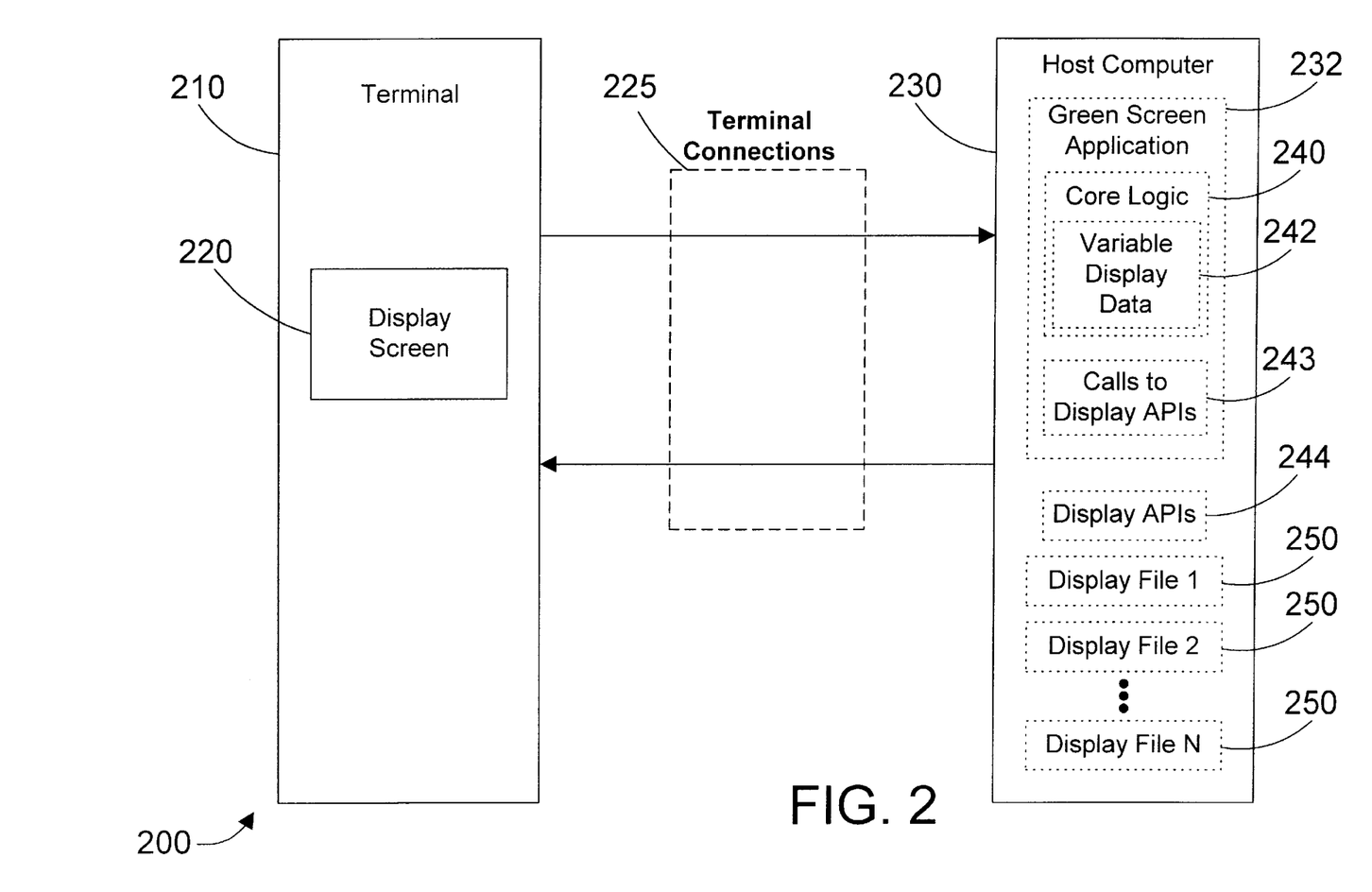
FIG. 2 is a block diagram of a host computer system running a green screen application.

Referring to FIG. 2, a host-based computer system 200 includes a dumb terminal 210 that is coupled via terminal connections 225 to a host computer 230. Dumb terminal 210 includes a display screen 220 for displaying information to a user. Host computer 230 includes a green screen application 232. Green screen application 232 includes core logic 240 that contains and/or generates variable display data 242. Green screen application 232 communicates with terminal 210 through calls 243 to display application program interfaces (APIs) 244. Display APIs 244 typically include a PUT API, a GET API, and a PUTGET API. The PUT API outputs display information to terminal 210 for display on display screen 220. The GET API receives input information from terminal 210. The PUTGET API outputs display information to terminal 210 for display on display screen 220, then waits for the user to respond with input information.

Data is output for display on terminal 210 by passing variable display data 242 to one of the PUT or PUTGET APIs through a call 243 to the appropriate API. The API then determines which display file 250 is specified. The display file may be specified along with the variable display data, but more commonly is specified by a separate FORMAT command that identifies the appropriate display file 250 before passing the variable display data 242 to the PUT or PUTGET API. The information to be output to terminal 210 typically includes a variable portion, represented by variable display data 242, combined with a fixed portion, represented by a corresponding display file 250. The combination of variable and fixed data is a screen or a portion of a screen to be displayed on terminal 210.

Figure 3:
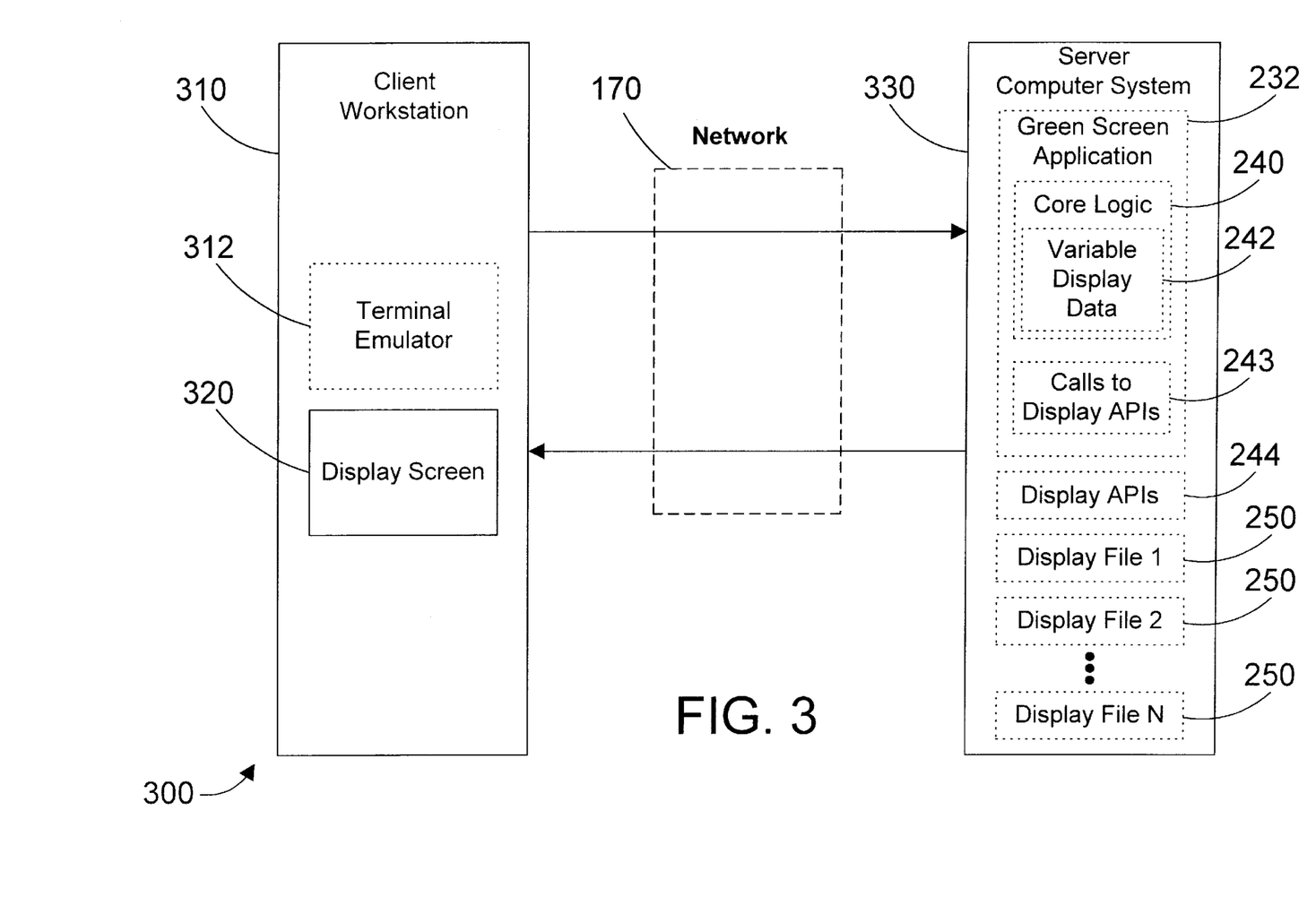
FIG. 3 is a block diagram of a client/server network running a green screen application.

The advent of the PC and computer networks for PCs created client/server environments. Referring to FIG. 3, a client/server computer system 300 may be used in the place of the host/terminal computer system 200 of FIG. 2. Green screen applications are easily ported to a client/server environment 300 by placing the green screen application 232 in a server computer system 330. The green screen application itself 232, display APIs 244 and display files 250 remain unchanged, but are now executed by a server that serves as a host. Network 170 replaces terminal connections 225, and a client workstation 310 replaces dumb terminal 210. Client workstation 310 is preferably a computer system (such as a PC) that can perform local processing as well as communicating with other computers via network 170. Client workstation 310 typically includes a terminal emulator 312 that makes client workstation 310 appear as a dumb terminal to any programs (such as green screen application 240) that format their display input and output for dumb terminals. In this manner, a client/server environment 300 may be made to emulate the host/terminal environment 200 of FIG. 2.

2. Detailed Description

According to a preferred embodiment of the present invention, an apparatus and method provide a GUI for an existing green screen application without disrupting the core logic of the green screen application in a manner that provides minimal processing overhead. The GUI is defined by classes that provide the desired interface, and display I/O function calls in the green screen application are replaced with calls to the GUI APIs that interact with the GUI classes.

Figure 1:
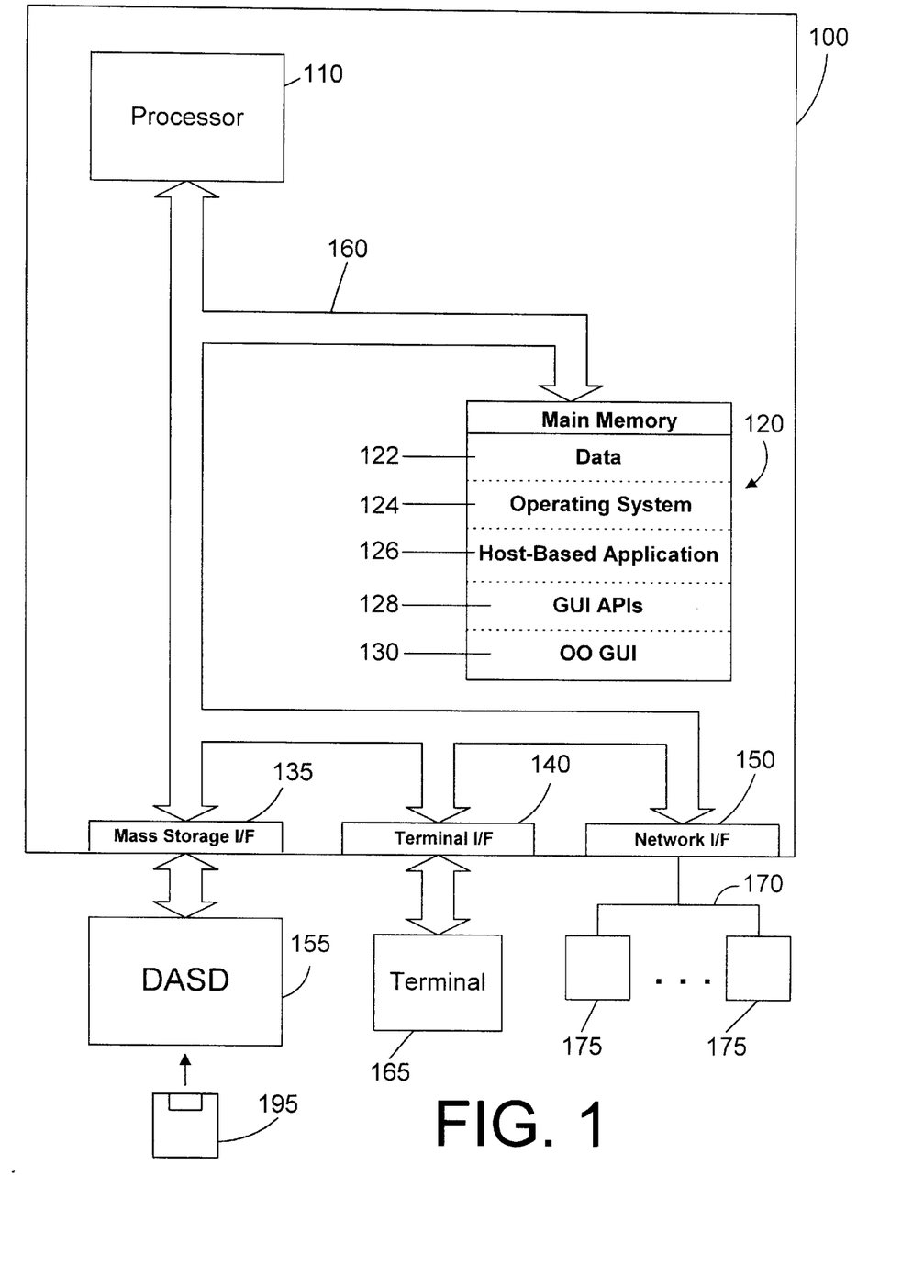
FIG. 1 is a block diagram of an apparatus in accordance with a preferred embodiment of the present invention.
Figure 4:
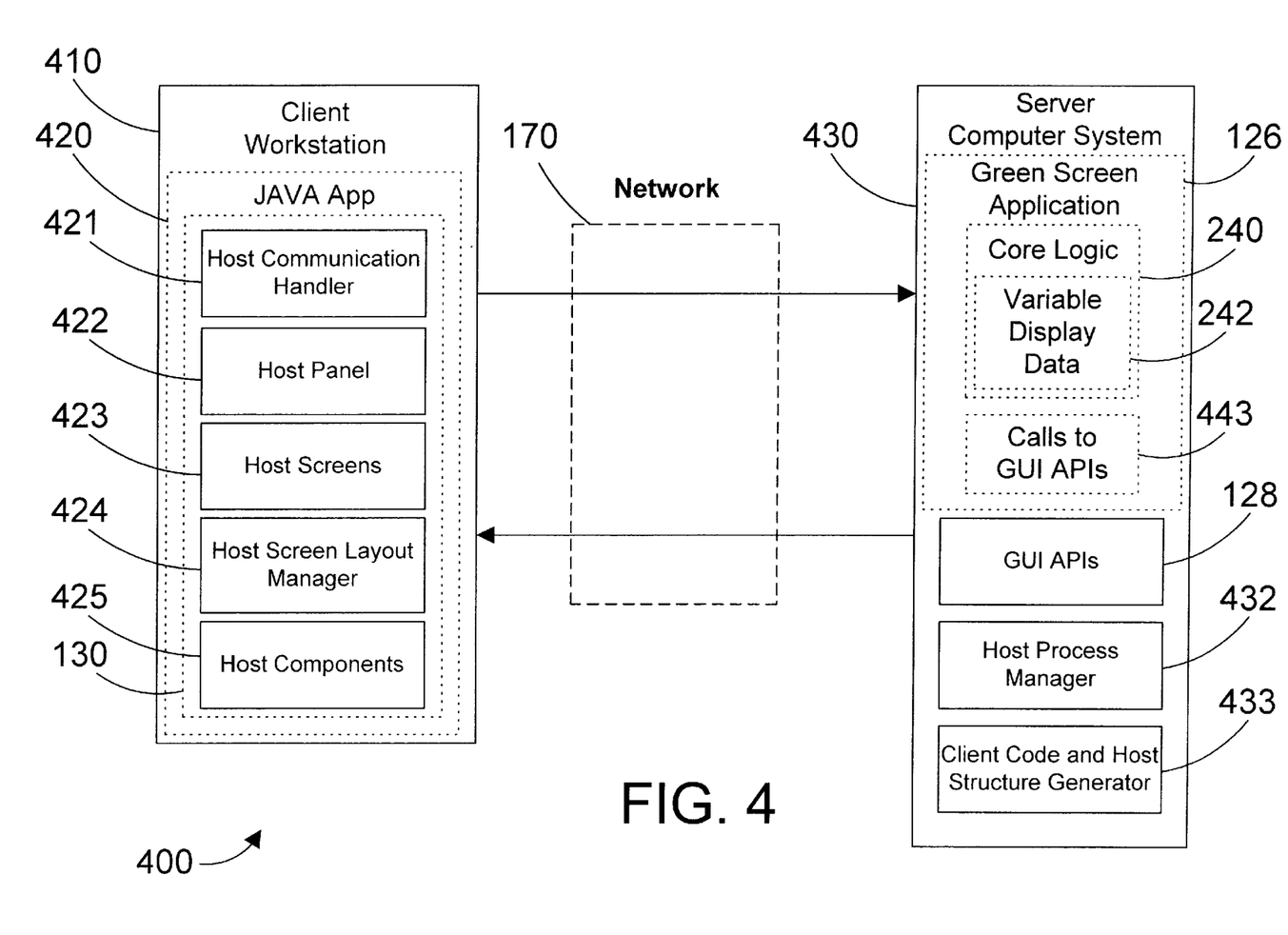
FIG. 4 is a block diagram of a client/server network that provides a GUI interface for a green screen application in accordance with the present invention.

Referring to FIG. 1, a computer system 100 in accordance with the preferred embodiment is a general representation of computer system 400 of FIG. 4. Computer system 100 illustrates host-based application 126, GUI APIs 128, and OO GUI 130 residing in memory 120 of computer system 100. Computer system 400 of FIG. 4 illustrates the best mode of the invention, wherein the host-based application 126, GUI APIs 128, and OO GUI 130 are distributed among multiple computer systems on a network.

Referring again to FIG. 1, computer system 100 is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 135, a terminal interface 140, and a network interface 150. These system components are interconnected through the use of a system bus 160. Mass storage interface 135 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, a host-based application 126, GUI APIs 128, and an object oriented GUI 130. GUI APIs 128 allow host-based application 126 to communicate with OO GUI 130. Computer system 100 utilizes well known virtual addressing mechanisms that allow the programs of computer system 100 to behave as if they only have access to a large, single storage entity instead of access to multiple, smaller storage entities such as main memory 120 and DASD device 155.

Therefore, while data 122, operating system 124, host-based application 126, GUI APIs 128, and GUI 130 are shown to reside in main memory 120, those skilled in the art will recognize that these programs are not necessarily all completely contained in main memory 120 at the same time. It should also be noted that the term "memory" is used herein to generically refer to the entire virtual memory of computer system 100, as illustrated in a computer system 400 in accordance with the best mode of the invention as shown in FIG. 4.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 135, terminal interface 140, network interface 150, and system bus 160.

Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the JAVA programming language.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions of host-based application 126 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 186 of FIG. 1) and CD ROM, and transmission type media such as digital and analog communications links.

The remainder of this specification describes how OO GUI 130 may be used as a front-end to host-based application 126. Classes are defined that implement OO GUI 130. Host-based application 126 is modified so that all its display I/O function calls are replaced with function calls to GUI APIs 128. GUI APIs 128 interact with the appropriate portions of OO GUI 130 to provide the graphical user interface for an existing host-based application 126.

Referring to FIG. 4, a client/server computer system 400 includes a client workstation 410 that is coupled to a server computer system 430 via network 170. Client workstation 410 is preferably a workstation that provides a JAVA Virtual Machine (JVM) that is capable of executing JAVA code. Included in client workstation 410 is an application or applet 420, preferably written in JAVA, shown as JAVA App 420 in FIG. 4. JAVA App 420 includes objects, including: host communication handler 421, host panel 422, host screens 423, host screen layout manager 424, and host components 425. Each of these objects are members of classes that are described in more detail below in reference to FIGS. 7–13.

Server computer system 430 includes a green screen application 126, which is a slightly altered version of the original green screen application 232 that runs on client/server system 300 of FIG. 3. Green screen application 126 maintains the same core logic 240 and the same variable display data 242, but all the display I/O function calls (i.e., calls 243 to Display APIs 244) in green screen application 126 have been replaced by calls 443 to GUI APIs 128. In addition, server computer system 430 includes a host process manager 432 and a client code and host structure generator 433. The host process manager 432 manages the processes running on server computer system 430. The client code and host structure generator 433 is a tool that is used to generate multiple host screens 423 from one or more display files 250, as discussed below with reference to FIG. 5.

Green screen application 126 directly calls GUI APIs 128 by virtue of replacing all its display I/O function calls 243 with calls 443 to GUI APIs 128. GUI APIs 128 send appropriate information over network 170 to communicate with the appropriate objects (i.e., 421–425) to provide a graphical user interface for green screen application 126 to a user of client workstation 410.

Figure 5:
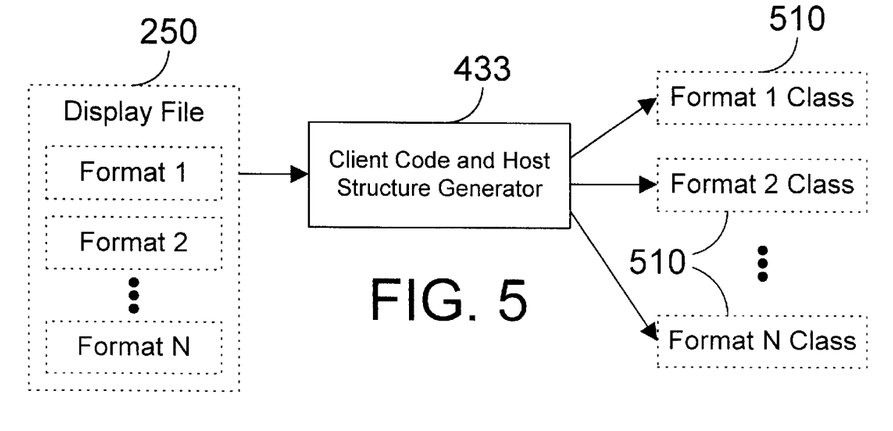
FIG. 5 is a block diagram of the client code and host structure generator of FIG. 4.

Referring to FIG. 5, client code and host structure generator 433 is used as a tool to convert existing display files into a set of classes that define screen attributes. A display file 250 typically includes the definition of one or more formats (e.g., format 1, format 2, . . . format N). Client code and host structure generator 433 preferably generates from each format in display file 250 a corresponding class 510. Each of these classes correspond to a screen format, which may define a whole screen or a portion of a screen. Once the classes are defined, they may be modified to provide enhanced GUI capabilities.

Figure 6:
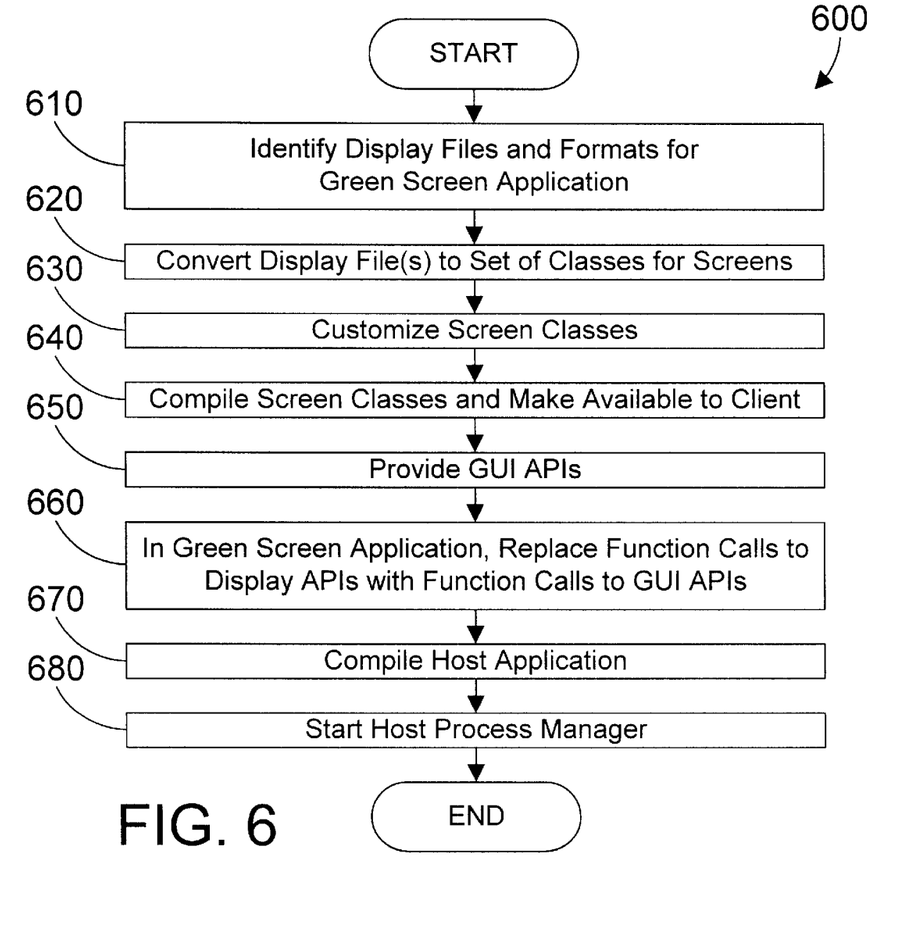
FIG. 6 is a flow diagram of a method in accordance with a preferred embodiment of the present invention.

Referring now to FIG. 6, a method 600 for migrating an existing green screen application 232 in accordance with a preferred embodiment to a client/server network computing environment begins by identifying the display files and formats that correspond to a selected green screen application (step 610). Next, the display files are converted to a set of classes representing screens in the graphical user interface (step 620). Step 620 is suitably performed by client code and host structure generator 433 as shown in FIG. 5. Once the classes for the screens have been created, they may be customized as needed to provide the enhanced GUI functions (step 630). Once the classes have been modified as required, the screen classes are compiled and made available to the client (step 640). In the preferred embodiment, the classes reside on the server but are made available to the client by providing an applet that loads the classes stored on the server to the client.

The next step is to provide the GUI APIs 128 that communicate with the customized screen classes created in step 630 (step 650). The green screen application is then processed to replace all function calls 243 to display APIs 244 with function calls 443 to GUI APIs 128 (step 660). The new host application 126 is then compiled (step 670), and a host process manager object is instantiated and run (step 680). With the exception of step 620, which is performed by the client code and host structure generator 433, the other steps of method 600 are performed by or under the control of a user, either manually, or by using one or more appropriate software tools. By performing the steps of method 600, an existing green screen application is easily ported to a client/server network computing environment with a graphical user interface (GUI) without disrupting any of the core logic of the green screen application.

Figure 7:
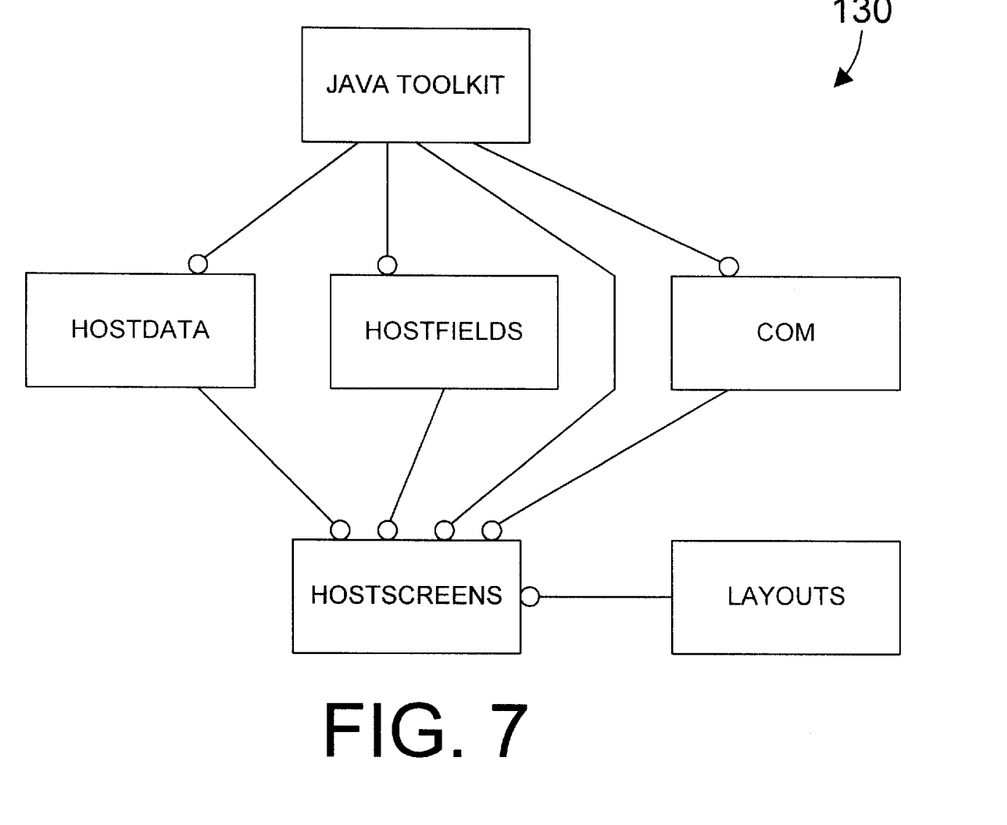
FIG. 7 is category diagram of the class categories of the OO portion of the preferred embodiment.

One particular implementation of the OO GUI 130 in accordance with the best mode of the invention is represented by FIGS. 7–14. Referring to FIG. 7, OO GUI 130 includes several different categories of classes, including: a JAVA Abstract Window Toolkit (hereinafter JAVA Toolkit), HostData, HostFields, COM, HostScreens, and Layouts. The HostData, HostFields, COM, and HostScreens categories all have a using relationship with the JAVA Toolkit category, indicating that classes in these categories may call one or more methods on classes in the JAVA Toolkit category. In addition, the HostScreens category has a using relationship with each of the HostData, HostFields, COM, and Layouts categories.

Figure 8:
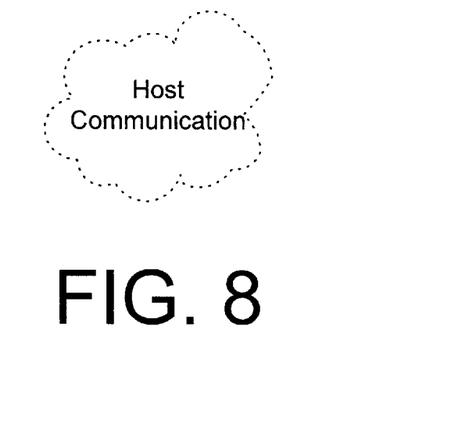
FIG. 8 is a class diagram of the class in the COM category of FIG. 7.

Referring to FIG. 8, the COM category includes a Host-Communication class that defines objects that manage the connection between client workstation 410 and server computer system 430. An instance of the HostCommunication class opens a socket connection from the client workstation 410 to the server computer system 430, and manages the data communication between them.

Figure 9:
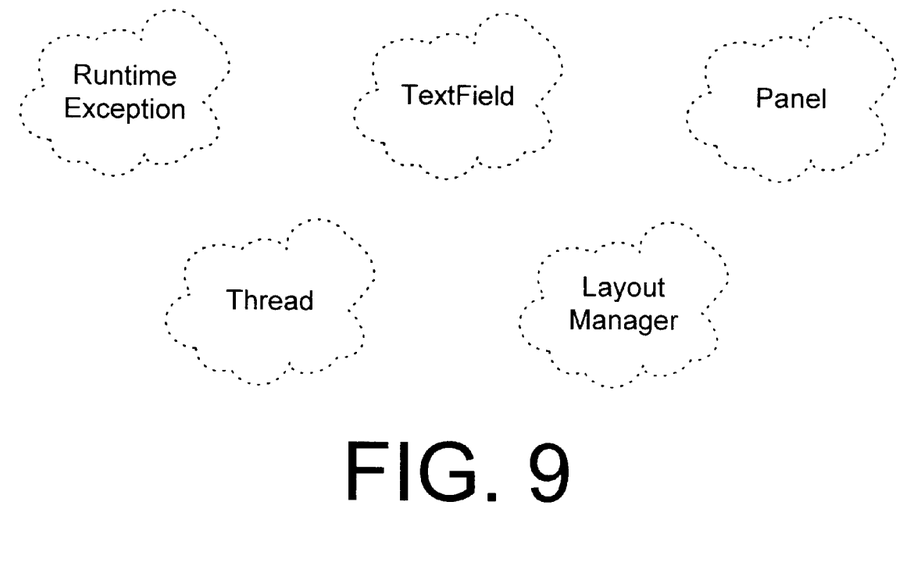
FIG. 9 is a class diagram of the classes in the JAVA Toolkit category of FIG. 7.

Referring to FIG. 9, the classes that belong to the JAVA Toolkit category include: RuntimeException, TextField, Panel, Thread, and LayoutManager. These classes are pre-defined by the JAVA Toolkit, and are used as superclasses for the classes of the invention to easily provide data and methods that are pre-defined in the JAVA Toolkit classes.

Figure 10:
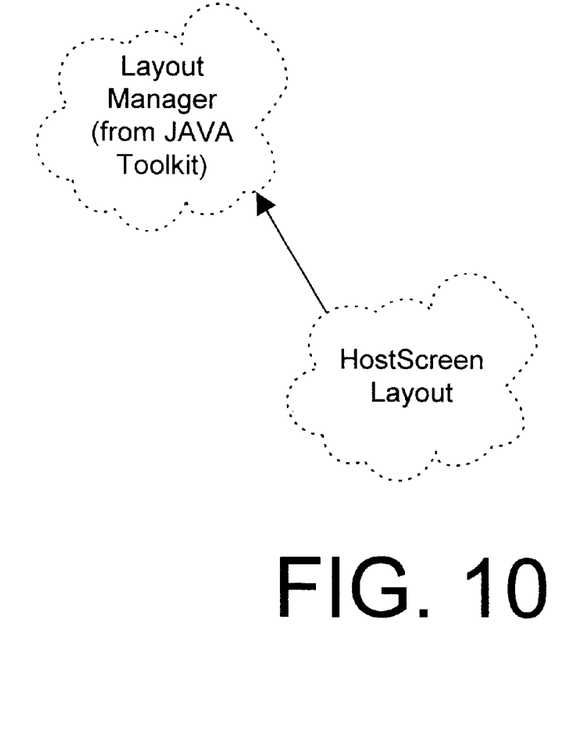
FIG. 10 is a class diagram of the class in the LAYOUTS category of FIG. 7.

Referring now to FIG. 10, the Layouts category includes a class HostScreenLayout that manages the layout of screens on the client. HostScreenLayout is a subclass of the LayoutManager class in the JAVA Toolkit, and is representative of concrete subclasses that are defined to represent particular host screen layouts. For example, one particular concrete implementation of HostScreenLayout is 5250ScreenLayout, which would define the layout of the host screen for an IBM 5250 terminal.

Figure 11:
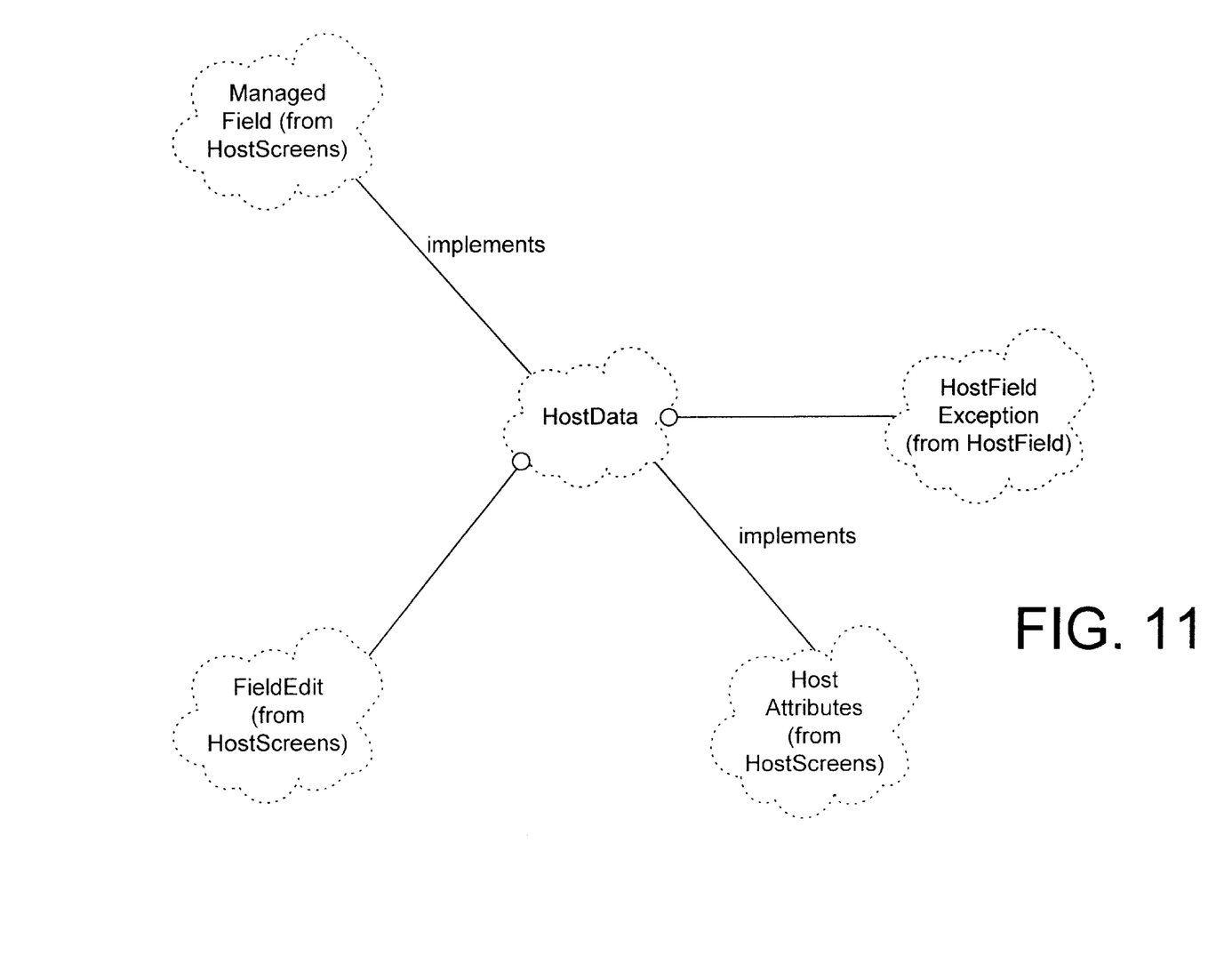
FIG. 11 is a class diagram of the classes in the HOST-DATA category of FIG. 7.

Referring to FIG. 11, the HostData category includes a HostData class. HostData represents any data that can be displayed by green screen application 126. HostData has a using relationship with the FieldEdit class (from the HostScreens category), which allows editing the HostData. HostData also has a using relationship with the HostField-Exception class (from the HostField category), which allows HostData to generate an exception under certain circumstances. HostData also implements the interfaces of the ManagedField and the HostAttributes classes (from the HostScreens category), which allow HostPanel (FIG. 13) to interact with HostData.

Figure 12:
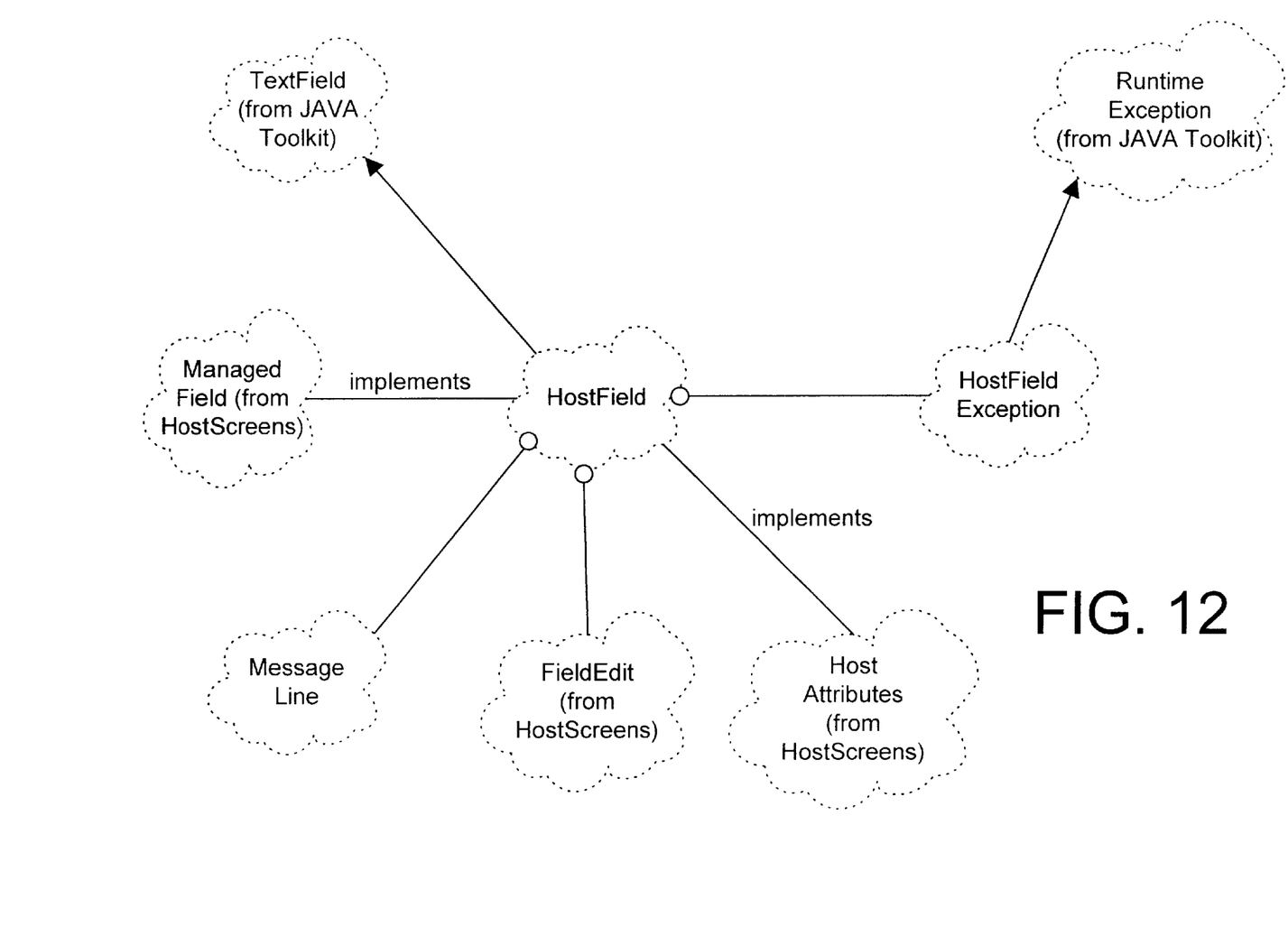
FIG. 12 is a class diagram of the classes in the HOST-FIELDS category of FIG. 7.

Referring to FIG. 12, the classes in the HostField category include: HostField, HostFieldException, and MessageLine. HostField represents a portion of a screen that can contain HostData. HostField has a using relationship with each of the HostFieldException class, the FieldEdit class (from the HostScreens category), and the MessageLine class. Host-Field also implements the interfaces of the MangedField and HostAttributes classes (from the HostScreens category), which allow HostPanel (FIG. 13) to interact with HostField.

Figure 13:
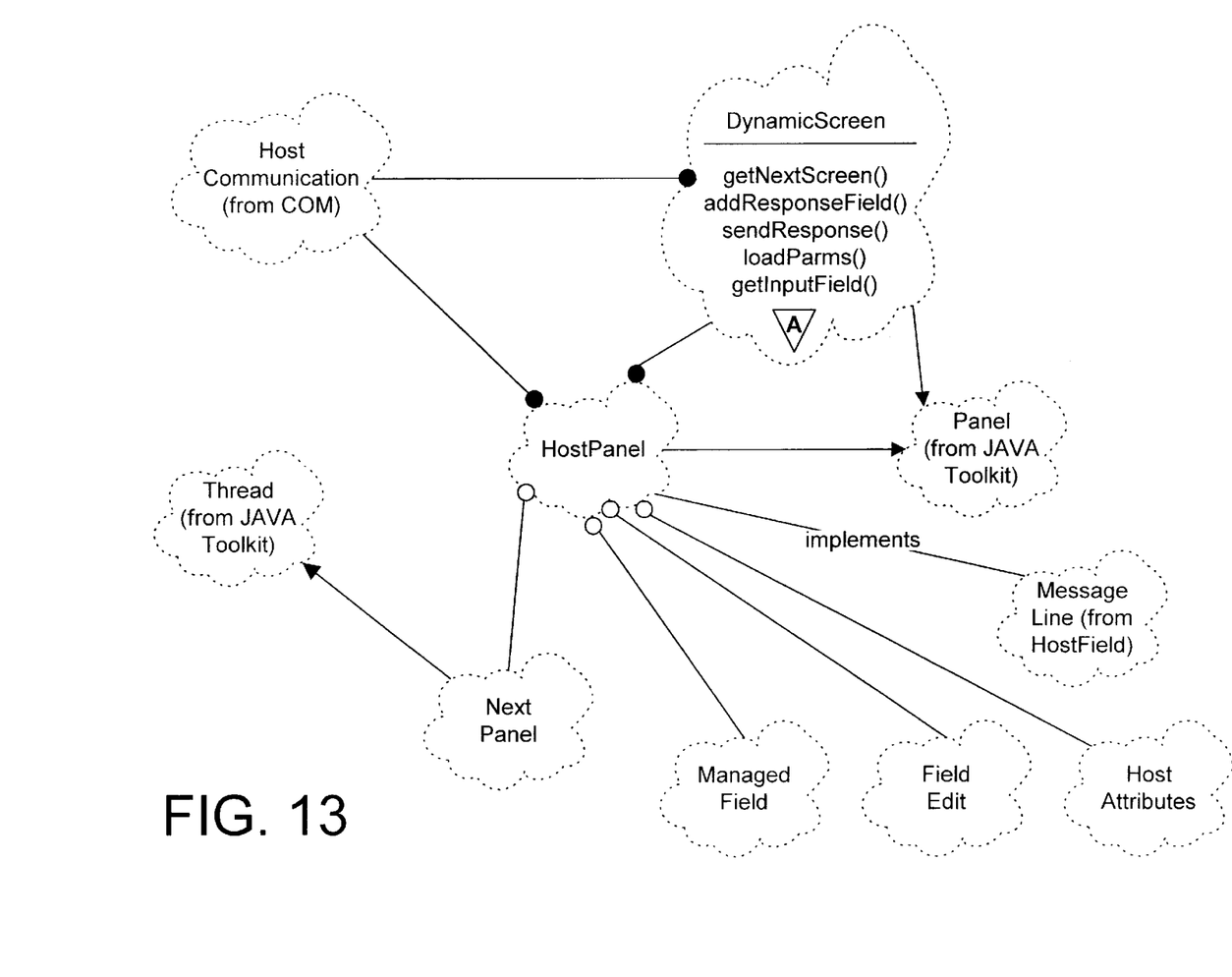
FIG. 13 is a class diagram of the classes in the HOSTSCREENS category of FIG. 7.

Referring now to FIG. 13, the classes in the HostScreens category include: HostPanel, DynamicScreen, NextPanel, ManagedField, FieldEdit, and HostAttributes. The Host-Panel class defines a panel of information that may be displayed to a user, and has a "has" relationship with each of the HostCommunication class (from the COM category) and the DynamicScreen abstract class. DynamicScreen defines a screen that corresponds to one or more screens in the green screen application 128. The DynamicScreen abstract class defines several methods (discussed in more detail below with reference to FIG. 14) that allow a user to interact with GUI screens that correspond to green screens in the green screen application. The DynamicScreen abstract class also has a "has" relationship with the HostCommunication class (from the COM category). DynamicScreen and HostPanel are both subclasses of the Panel class in the JAVA Toolkit category. The Panel class defines a part of a screen window that can contain items to be displayed to the user. HostPanel has a using relationship with the NextPanel class, which is a subclass of the Thread class in the JAVA Toolkit category. By subclassing from Thread, NextPanel will run under its own thread of control. The concepts of threads of control are well known in the art. HostPanel also has a using relationship with the ManagedField class, the FieldEdit class, and the HostAttributes class. In addition, HostPanel implements the interface of the MessageLine class so that a message line may be displayed on a HostPanel.

Figure 14:
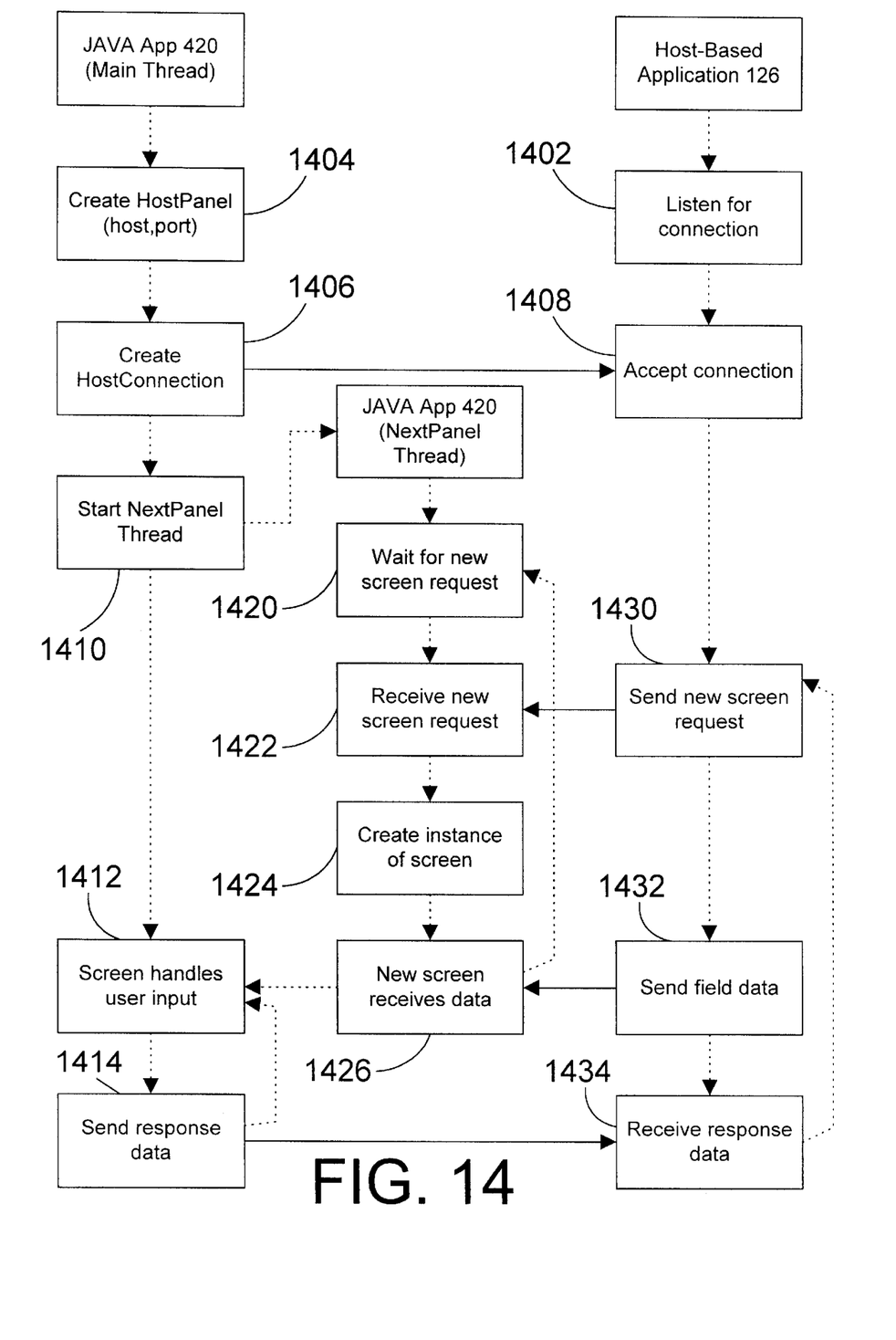
FIG. 14 is a flow diagram of one exemplary implementation using the classes of FIGS. 8–13.

The interaction between the classes in FIGS. 8–13 is best understood by considering a specific process flow example shown in FIG. 14. The system configuration of FIG. 4 and the resulting process flows of FIG. 14 assume that an existing green screen application 232 has already been converted to a GUI green screen application 126 by performing the steps in method 600 of FIG. 6. The last step 680 in method 600 is to start the host process manager 432. Host process manager 432 then runs the host-based application 126 (FIG. 14), and listens for a connection (step 1402). The execution of host-based application 126 and step 1402 may be performed by command of the user, but are preferably performed when server computer system 430 first starts up.

Once host process manager 432 is listening for a connection (step 1402), the JAVA App 420 may be executed. JAVA App 420 begins by creating a HostPanel (step 1404) by invoking the constructor method on the HostPanel class and passing the name of the host and the port identifier as parameters. HostPanel then invokes the constructor method on the HostCommunication class (step 1406), which creates an instance of HostCommunication that interacts with host process manager 432 for a connection to the host. Host process manager 432 accepts the connection (step 1408) by invoking a GUI API. Next, HostPanel starts NextPanel running on a new thread by invoking the constructor method on NextPanel, and by then invoking the start( ) method on the newly formed NextPanel object (step 1410). The NextPanel object corresponds to a GUI screen that corresponds to one or more screens in the existing green screen application 232. The main thread then waits in step 1412 for data from the NextPanel thread.

The NextPanel thread then executes the getNextScreen( ) method on the concrete subclass of NextPanel, which causes the NextPanel thread to perform the steps of: waiting for a new screen request (step 1420); receiving the new screen request (step 1422); creating an instance of the screen (step 1424); and receiving field data into the new screen (step 1426). Note that step 1422 awaits a screen request from host-based application 126, which sends a new screen request (step 1430) by invoking a GUI API. In similar fashion, step 1426 awaits field data from host-based application 126, which sends field data (step 1432) by invoking a GUI API.

The NextPanel thread receives field data from host-based application 126 by invoking loadParms( ) and getInputField( ) methods on the DynamicScreen class. LoadParms( ) uses the HostConnection object to receive the field data for the entire screen over the socket connection to the host. GetInputField( ) is a method that allows a user to specify which data in the screen is required. Once the NextPanel thread has received the field data in step 1426, the main thread of JAVA App 420 handles the user input to the screen (step 1412), sends response data that the user inputs on the screen (step 1414), and passes this data to host-based application 126, which receives the response data (step 1434) by invoking a GUI API. Note that the user input to the screen in step 1412 is preferably made by invoking one or more JAVA-defined methods on the concrete screen subclass of dynamic screen, such as addResponseField( ) and sendResponse( ). AddResponseField( ) is used to compile user input into different fields, while sendResponse( ) is invoked to send all user input to host-based application 126.

Referring back to FIG. 4, we can see the correlation between the objects 421–425 and 432–433 and the classes described in FIGS. 8–12. The Host Communication Handler object 421 is an instance of the HostCommunication class of FIG. 8. The Host Panel object 422 is an instance of the HostPanel class of FIG. 13. The Host Screens object 423 is an instance of the DynamicScreens class of FIG. 13. The Host Screen Layout Manager object 424 is an instance of the HostScreenLayout class of FIG. 10. The Host Components object 425 is representative of an instance of either the HostData class of FIG. 11, or the HostField class of FIG. 12. The combination of all of these classes define OO GUI 130.

Host Process Manager 432 is a program that manages the processes on the server computer system 430. The Client Code and Host Structure Generator 433 is a program that generates the various dynamic screen classes that correspond to green screen application screens.

The present invention thus provides a way to easily and inexpensively migrate host-based applications to a network computing environment with a GUI, without disturbing the core logic of the host application and without suffering the performance drawbacks of screen scraping. The present invention takes advantage of the processing power of client workstations in a network computing environment by having the client run the GUI. The underlying green screen application is modified to replace all display function calls with new function calls to the GUI, but this change is relatively minor and does not affect the underlying core logic of the application. In addition, the new function calls access the GUI screens directly without having to determine which screen is being displayed.

While the invention has been particularly shown and described with reference to preferred embodiments thereof, it will be understood by those skilled in the art that various changes in form and details may be made therein without departing from the spirit and scope of the invention.

We claim:

1. An apparatus comprising:
   at least one processor;
   a memory coupled to the at least one processor;
   a plurality of screen formats residing in the memory, each screen format corresponding to a display screen that may be displayed on a dumb terminal;
   a computer program residing in the memory and executed by the at least one processor, the computer program generating from the plurality of screen formats a plurality of object-oriented screen classes that correspond to the plurality of screen formats.

2. The apparatus of claim 1 wherein the computer program generates from each screen format a corresponding object oriented screen class.

3. The apparatus of claim 1 wherein the plurality of object-oriented screen classes each include a plurality of object methods that allow a client to interact with data that corresponds to data on a display screen.

4. The apparatus of claim 3 wherein the plurality of object methods include:
   a loadParms( ) object method that loads the parameters for the display screen in the host-based application;
   a getInputField( ) object method that retrieves the data from a specified input field in the display screen in the host-based application;
   an addResponseField( ) object method that compiles user input into different fields in the display screen in the host-based application;
   a sendResponse( ) object method that sends all user input to the host-based application; and
   a getNextScreen( ) object method that retrieves the next screen from the host-based application.

5. A method for providing a graphical user interface (GUI) for an existing host-based application, the method comprising the steps of:
   automatically generating a plurality of object oriented screen classes from a plurality of pre-existing screen formats, each pre-existing screen format corresponding to a display screen that may be displayed on a dumb terminal; and
   modifying the plurality of screen classes to define a plurality of screens in the GUI.

6. The method of claim 5 wherein the step of automatically generating the plurality of screen classes comprises the step of automatically generating from each pre-existing screen format a corresponding screen class.

7. The method of claim 5 wherein the plurality of screen classes each include a plurality of object methods that allow a client to interact with data that corresponds to data on a display screen for the existing host-based application.

8. The method of claim 7 wherein the plurality of object methods include:
- a loadParms( ) object method that loads the parameters for the display screen in the host-based application;
- a getInputField( ) object method that retrieves the data from a specified input field in the display screen in the host-based application;
- an addResponseField( ) object method that compiles user input into different fields in the display screen in the host-based application;
- a sendResponse( ) object method that sends all user input to the host-based application; and
- a getNextScreen( ) object method that retrieves the next screen from the host-based application.

* * * * *